United States Patent
Wu et al.

(10) Patent No.: US 8,023,467 B2
(45) Date of Patent: Sep. 20, 2011

(54) METHOD AND SYSTEM FOR EFFICIENT DRX OPERATION DURING HANDOVER IN LTE

(75) Inventors: Wei Wu, Coppell, TX (US); James Earl Womack, Bedford, TX (US); Zhijun Cai, Euless, TX (US)

(73) Assignee: Research In Motion Limited, Ontario (CA)

( * ) Notice: Subject to any disclaimer, the term of this patent is extended or adjusted under 35 U.S.C. 154(b) by 598 days.

(21) Appl. No.: 11/741,581

(22) Filed: Apr. 27, 2007

(65) Prior Publication Data

US 2008/0268845 A1 Oct. 30, 2008

(51) Int. Cl.
*H04W 4/00* (2009.01)
(52) U.S. Cl. .................. 370/331; 455/574; 455/436
(58) Field of Classification Search .................. 370/331; 455/574, 436
See application file for complete search history.

(56) References Cited

U.S. PATENT DOCUMENTS

| | | | | |
|---|---|---|---|---|
| 5,940,380 | A * | 8/1999 | Poon et al. | 370/330 |
| 7,751,818 | B2 * | 7/2010 | Chaskar et al. | 455/436 |
| 2007/0291695 | A1 * | 12/2007 | Sammour et al. | 370/331 |
| 2007/0291729 | A1 * | 12/2007 | Dalsgaard et al. | 370/347 |
| 2008/0096557 | A1 * | 4/2008 | Rinne et al. | 455/435.1 |
| 2008/0101268 | A1 * | 5/2008 | Sammour et al. | 370/311 |
| 2008/0146231 | A1 * | 6/2008 | Huang et al. | 455/436 |
| 2008/0167089 | A1 * | 7/2008 | Suzuki et al. | 455/574 |
| 2008/0181127 | A1 * | 7/2008 | Terry et al. | 370/252 |
| 2008/0186919 | A1 * | 8/2008 | Huang et al. | 370/331 |
| 2008/0254797 | A1 * | 10/2008 | Achtari et al. | 455/436 |
| 2009/0023448 | A1 * | 1/2009 | Attar et al. | 455/436 |
| 2009/0264132 | A1 * | 10/2009 | Tajima et al. | 455/436 |

FOREIGN PATENT DOCUMENTS

| | | |
|---|---|---|
| WO | 2008/023242 A3 | 2/2008 |
| WO | 2008/023927 A2 | 2/2008 |
| WO | 2008/048022 A1 | 4/2008 |
| WO | 2008/057296 A1 | 5/2008 |

OTHER PUBLICATIONS

3GPP TS 36.300 v1.0.0 (Mar. 2007) Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)".
Research in Motion Limited, "DRX Operation During Handover" 3GPP TSG-RAN-WG2 Meeting #58, Kobe, Japan, May 7-11, 2007, Document R2-071956. Texas Instruments Inc., "Reducing Handover Latencies in UL Synchronization and Initial UL Allocation in LTE" 3GPP TSG RAN WG2 Meeting #55, Seoul, Korea, Oct. 9-13, 2006, Document R2-062837.
LG Electronics, "DRX Scheme" 3GPP TSG-RAN WG2 #56bis, Jan. 15-Jan. 19, 2007, Sorrento, Italy, Document R2-070265.
Ericsson, "Handover Procedure for DRX Operation in LTE Active" 3GPP TSG-RAN WG2 Meeting #56bis, Sorrento, Italy, Jan. 15-19, 2007, Document R2-070043.

* cited by examiner

*Primary Examiner* — Jinsong Hu
*Assistant Examiner* — Qun Shen
(74) *Attorney, Agent, or Firm* — Hamilton & Terrile, LLP (57) ABSTRACT

A method and system for efficient DRX operation during handover in LTE in which a user equipment expects handover to occur, the method having the steps of: checking whether a no handover initiation decision is received within a predetermined time period; if no, performing the steps of: ensuring the user equipment is not in a DRX sleep period during reception of a handover grant; checking whether a handover grant is received, and if yes, performing a handover procedure; and if no, resuming a DRX sleep interval; and if yes, ending the process.

15 Claims, 8 Drawing Sheets

(b) Shorter DRX sleep period

(b) Shorter DRX sleep period

FIG. 7

(a) Continuous channel monitoring

FIG. 6

(b) Optimal shorter DRX sleep period

FIG. 9

(a) Avoid unnecessary Continuous channel monitoring

METHOD AND SYSTEM FOR EFFICIENT DRX OPERATION DURING HANDOVER IN LTE

FIELD OF THE DISCLOSURE

The present disclosure relates to handing over of user equipment in a long-term evolution (LTE) architecture, and in particular, to the handling of handovers during extended discontinuous reception (DRX) cycles in an LTE_ACTIVE state.

BACKGROUND

In the long-term evolution infrastructure, user equipment (UE) can be in one of two radio resource control states. These are LTE_IDLE and LTE_ACTIVE.

The UE can be configured for discontinuous reception (DRX) in both the LTE_IDLE and the LTE_ACTIVE states. In the LTE_IDLE state, the DRX allows the UE to synchronize its listening period to a known paging cycle of the network. By synchronizing the listening period, the UE can turn off its radio transceiver during the standby period, thereby significantly saving battery resources. DRX parameters allow the mobile to synchronize with the network and to know that it will not receive another signal until a specified time has elapsed.

It is proposed at the 3GPP TSG-RAN working groups that DRX also be used when the UE is LTE-ACTIVE state. An issue with this is handover response.

During the DRX awake period, the UE is triggered to send a measurement report (MR) in accordance with rules that it receives from radio resource control (RRC) messages, system information blocks, among others.

In operation, a source enhanced node B (eNB) makes a handover initiation decision based on the measurement report and radio resource management information to hand off the user equipment to a target eNB. This handover initiation decision is made before the source eNB sends the handover request to the target eNB. The handover request is then sent to the target eNB. The target eNB performs admission control dependent on the received bearer quality of service (QoS) information and loading conditions. If the resources can be granted by the target eNB, it configures them according to the received bearer QoS information and reserves the appropriate resources.

The target eNB sends the handover request acknowledgement to the source eNB. The handover request acknowledgement includes a transparent container to send to the UE as part of the handover command. The source eNB then sends the handover command to the UE when the UE next gets out of its DRX sleep period.

Based on the current DRX operation during handover, the handover command could be delayed due to the DRX sleep period, which may cause longer handover latency.

BRIEF DESCRIPTION OF THE DRAWINGS

The present application will be better understood with reference to the drawings in which.

DETAILED DESCRIPTION

The present disclosure provides a method and system for better handover handling in an LTE architecture. In accordance with the present disclosure, a method is disclosed in which the UE starts continuous channel monitoring or transits to a shorter DRX sleep period after sending a measurement report to an eNB if the measurement report is only sent based on preconditions being met, or after sending a measurement report to an eNB if the measurement report indicates certain parameters which may trigger handover.

If the source eNB decides that no handover should occur, the source eNB then immediately signals to the UE in order to stop the UE from continuous channel monitoring or prevent the UE from entering a shorter DRX sleep period.

In the case of a handover initiation decision, the present method discloses two alternatives. In a first alternative, the source eNB does not signal to the UE after the handover initiation decision. Since the UE by default has already started continuous channel monitoring or has transited to a shorter DRX cycle, the UE will then be more quickly responsive to a handover command.

In a second alternative, the source eNB could signal to the UE to enter a DRX sleep period for a predetermined amount of time where the predetermined amount of time correlates to an estimate for the lag in receiving a handover command. The timing estimation for the extended wake period or the shorter DRX cycle is based on the latency estimation for the target eNB to complete the admission control and send back the handover request acknowledgement to the source eNB.

If the handover request for the target eNB is not granted, the source eNB should signal to the UE to stop channel monitoring and resume its normal DRX cycle. In the meantime, the source eNB could restart the handover process by sending a new measurement control to the UE and to try other candidate target eNBs.

The present disclosure therefore provides a method for efficient DRX operation during handover in LTE in which a user equipment expects handover to occur, the method comprising the steps of: checking whether a no handover initiation decision is received within a predetermined time period; if no, performing the steps of: ensuring the user equipment is not in a DRX sleep period during reception of a handover grant; checking whether a handover grant is received, and if yes, performing a handover procedure; and if no, resuming a DRX sleep interval; and if yes, ending the process.

A system for efficient DRX operation during handover in LTE comprising user equipment and an enhanced node B, characterized by means for: checking whether a no handover initiation decision is received within a predetermined time period; if no, means for: ensuring the user equipment is not in a DRX sleep period during reception of a handover grant; checking whether a handover grant is received, and if yes, performing a handover procedure; and if no, resuming a DRX sleep interval.

Figure 1:
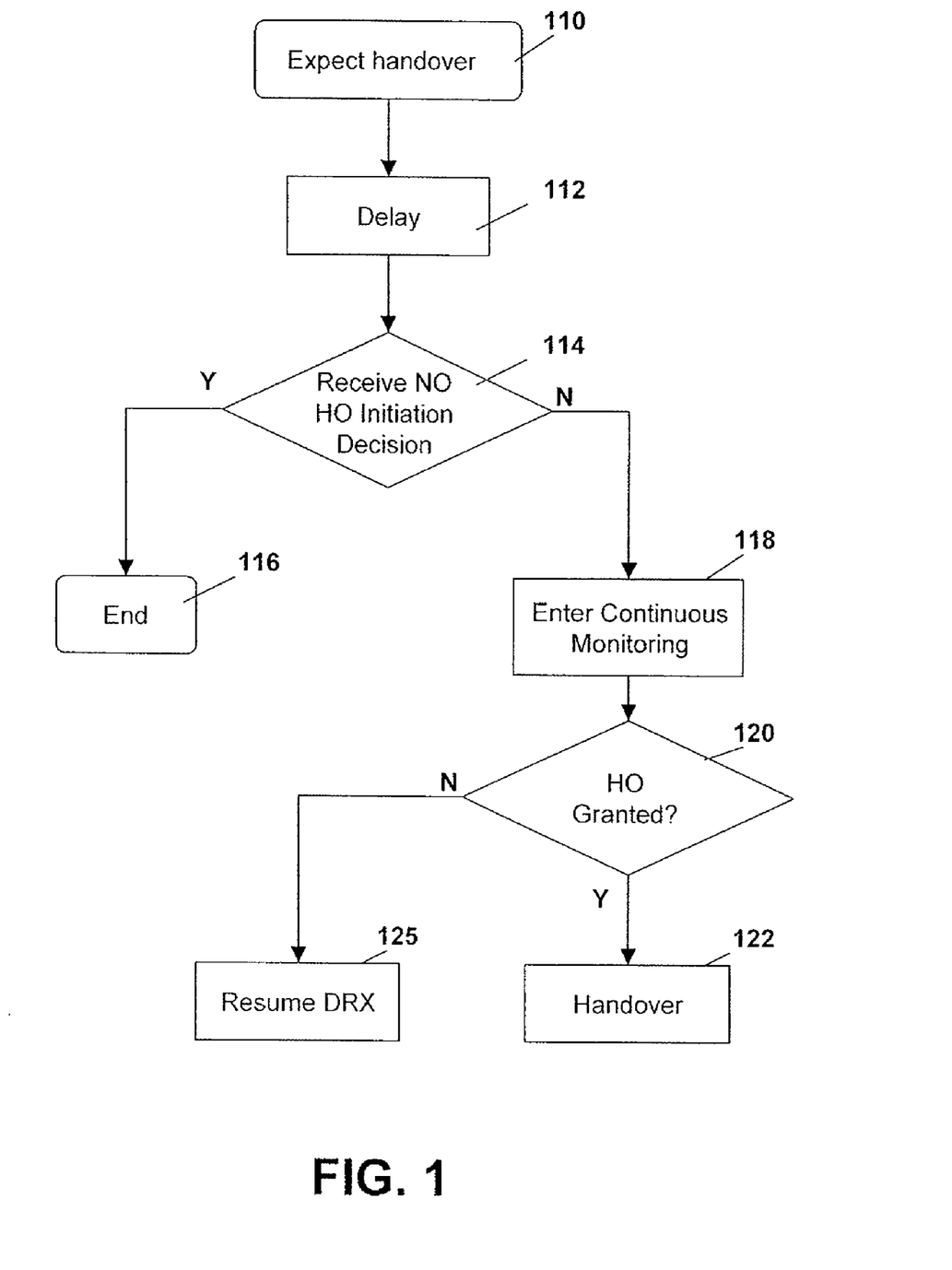
FIG. 1 is flow chart showing a method on a UE for efficient DRX operation during handover in LTE.

Reference is now made to FIG. 1, which illustrates efficient DRX procedures during handover from a UE perspective. In FIG. 1 a precondition 110 is that a network handover is expected by user equipment. In a first embodiment, it is common that a handover comes after a measurement report. Specifically, in LTE, the UE is triggered to send a measurement report by rules that it receives from radio resource control messages, system information blocks, among others. Thus, if the UE is required to send a measurement report, then a handover could be expected.

In an alternative embodiment, measurement reports could be sent periodically. In this case however, the measurement report will generally contain information about network conditions and if these conditions are below or above a predetermined threshold, depending on the condition, this could indicate to the UE that a handover is likely to occur.

If a handover is expected to occur, the process proceeds to step 112 in which a short delay is implemented. The short delay in step 112 could be inherent in the mobile device moving from its DRX awake cycle to the DRX sleep period. In one embodiment the delay could be lengthened. In alternative embodiments, the delay could merely be part of the standard DRX cycle.

The process proceeds to step 114 in which it checks to see whether a "no handover initiation decision" has been received at the UE. As will be appreciated by those skilled in the art, the source eNB may have information that would allow the source eNB to immediately respond to the UE to indicate that no handover can occur. This information could, for example, be based on an exchange of information between eNBs within a network. In LTE, one possibility is that eNBs can communicate between each other, thereby providing information about loading to each other. Thus, if a source eNB receives a measurement report which indicates that a handover may be required to a target eNB, the source eNB could check data stored on the source eNB about the loading of the target eNB and make a rapid determination about whether or not such a transfer should occur.

From step 114, if a no handover initiation decision has been received by the UE, the process proceeds to step 116 and ends. As will be appreciated by those skilled in the art, since the device has received an indication that it will not be handing over to a target eNB, the device can maintain its current DRX sleep cycle.

From step 114, if the UE does not receive a "no handover initiation decision", the process proceeds to step 118 in which the device enters into a continuous channel monitoring. Since the device is expecting a handover decision, the continuous channel monitoring provides for a shortened response period to a handover command.

Preferably, the process of entering the continuous channel monitoring in step 118 is a default action by the UE whenever it sends a measurement report or expects a handover to be triggered.

From step 118 the process proceeds to step 120 in which a check is made to see whether or not handover has been granted. As will be appreciated by those skilled in the art, when the source eNB receives a measurement report with handover preconditions specified, if it determines that there should be a handover initiation decision, the request is sent to the target eNB for a handover. The target eNB can then signal back to the source eNB whether or not the handover command has been accepted. This is then communicated to the UE.

In step 120 the UE checks to see whether handover was granted. If handover is to occur, the process proceeds to step 122 in which handover procedures are started. Conversely, if no handover is to occur, the process proceeds to step 125 in which the UE resumes its normal DRX cycle.

Using the method of FIG. 1, a UE can more quickly respond to handover commands by entering a continuous monitoring state upon detecting preconditions for handover. Further, battery life on the device can be saved through the receipt of a no handover initiation decision before the continuous state is entered, or the immediate signaling of the resume DRX 125 if a handover is not granted.

Figure 2:
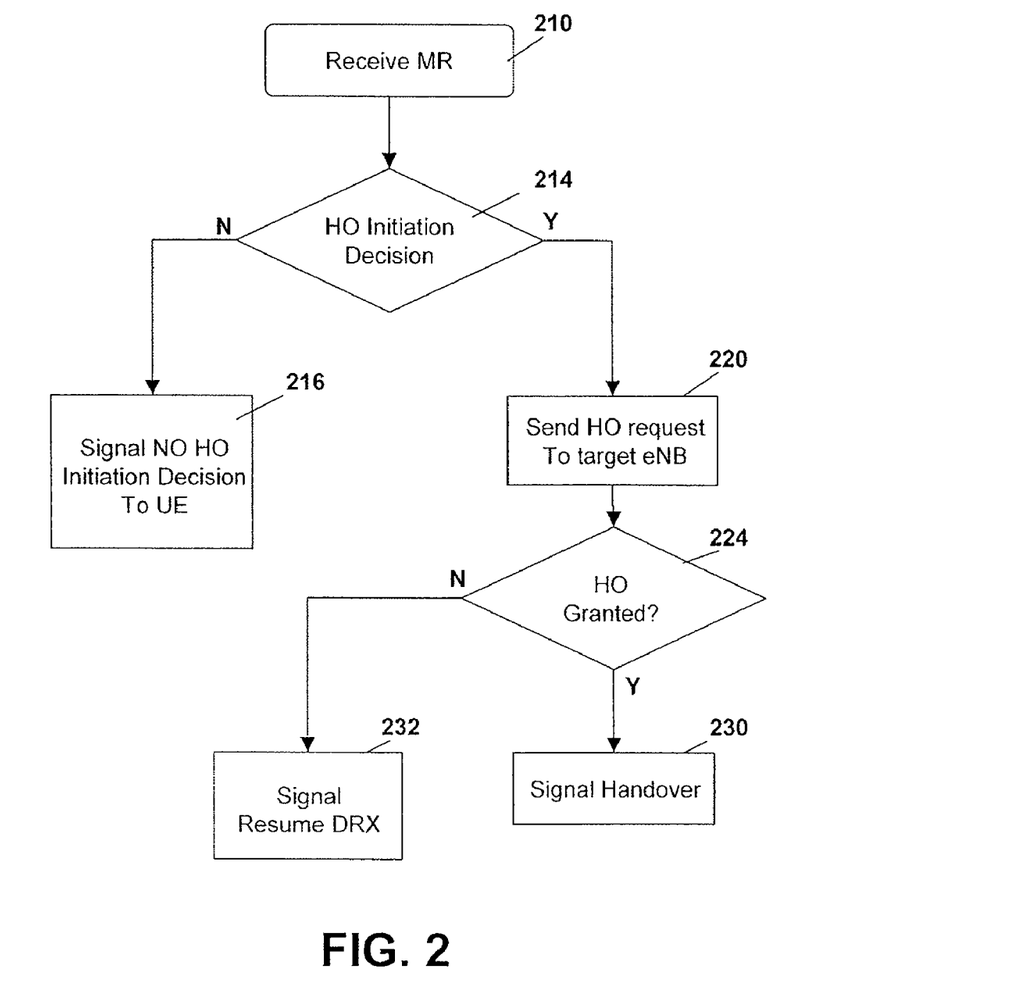
FIG. 2 is a flow chart showing a method on an eNB for efficient DRX operation during handover in LTE.

Reference is now made to FIG. 2. From the eNB perspective, the eNB receives a measurement report from a UE at step 210. The process then proceeds to step 214 in which the eNB makes a handover initiation decision. If, in step 214, it is determined that no handover should occur, the process proceeds to step 216 in which the UE is signaled that no handover will occur. As will be appreciated, this could be a signal that no handover should occur, or conversely, could be a signal to the UE to not enter a continuous channel monitoring or prevent the UE from entering a shorter DRX sleep period.

From step 214, if the handover initiation decision indicates that a handover should occur, the process proceeds to step 220 in which a handover request is sent to the target eNB. The process then proceeds to step 224 in which the eNB receives a handover request acknowledgement or negative acknowledgement. In step 224 the process checks whether an ACK was received, thereby signaling that handover is granted. If an ACK was received, the process proceeds to step 230 in which the handover is signaled to the UE.

Conversely, if an ACK is not received, the process proceeds to step 232 in which an explicit signal is sent to the UE to stop channel monitoring or to resume a normal DRX cycle.

After step 232 the process could end or optionally, the source eNB could restart the handover process by sending new measurement control information to the UE and trying other candidate target eNBs (not shown).

Figure 3:
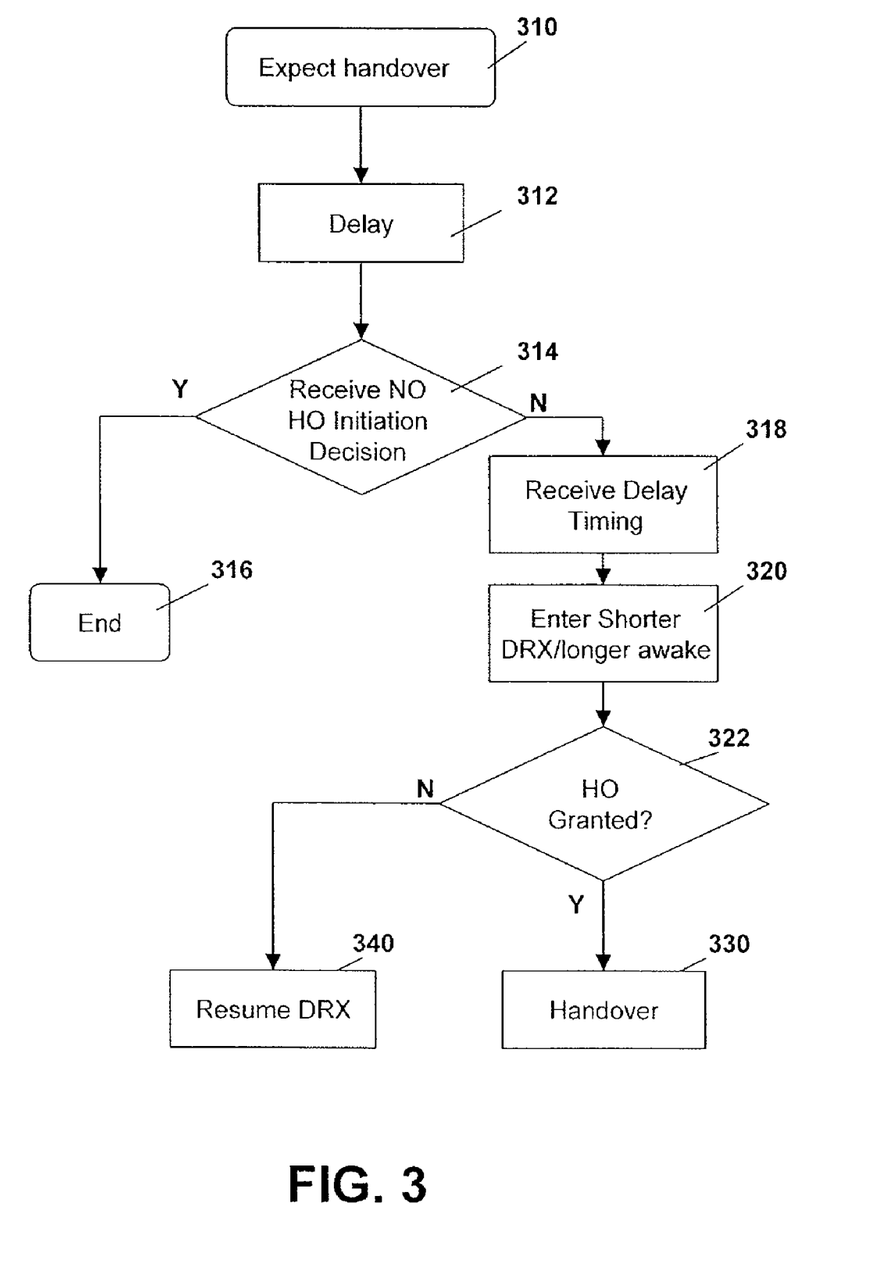
FIG. 3 is a flow chart showing an alternative method on a UE for efficient DRX operation during handover in LTE.

Reference is now made to FIG. 3. FIG. 3 illustrates an alternative embodiment to that of FIG. 1 in which rather than continuous monitoring being entered during an anticipated handover, a shorter DRX period can be entered.

The UE side behavior has a precondition 310 that a handover is expected. As indicated above with reference to FIG. 1, this could be based on a measurement report being sent to an eNB or various parameters within the measurement report being greater than or less than a threshold, depending on the parameters.

The process then proceeds to step 312 in which a delay is utilized. The delay could be part of the DRX awake period or could be added based on the precondition 310 being met. The process then proceeds to step 314 in which the UE checks to see whether it has received a no handover initiation decision.

If, in step 314, a no handover initiation decision has been received, the process proceeds to step 316 and ends.

Conversely if a "no handover initiation decision" has not been received, the process proceeds to step 318 in which a timing estimation of the expected handover command latency could be received from the eNB in order to either extend the DRX awake period or to instruct the UE about the longest DRX sleep period that the UE can go into. As will be appreciated by those skilled in the art, the DRX sleep period instructed in step 318 would be shorter typically than the standard DRX cycle and the UE would, in one embodiment, wake up right before the reception of the handover command.

The timing estimation for step 318 could be based on information from standards bodies or based on carriers' pre-configured information. The timing period could depend on whether the handover is inter-RAT (radio access technology) or intra-RAT and different delays could be provided for each case.

For example, if the eNB has stored that an inter-RAT handover request takes between 40 and 50 milliseconds to process by a target eNB, the information communicated to the UE could indicate that the UE should leave its awake period for at least 50 milliseconds. Alternatively, the information could indicate that the UE should go into a shorter DRX period of 40 milliseconds.

The above further provides the opportunity to carriers to customize the sleep period or the delay for the awake period during DRX.

As will be further appreciated, if the UE moves into a shorter DRX period based on the processing time, battery life will be saved for that time period.

The process then proceeds to step 320 in which the longer DRX awake period or the shorter DRX sleep period are implemented.

The process then proceeds to step 322 in which a check is made to see whether or not handover has been granted. If handover is granted, the process proceeds to step 330 in which handover procedures are initiated.

Alternatively, if handover is not granted, the process proceeds to step 340 in which the normal DRX period is resumed on the UE.

Figure 4:
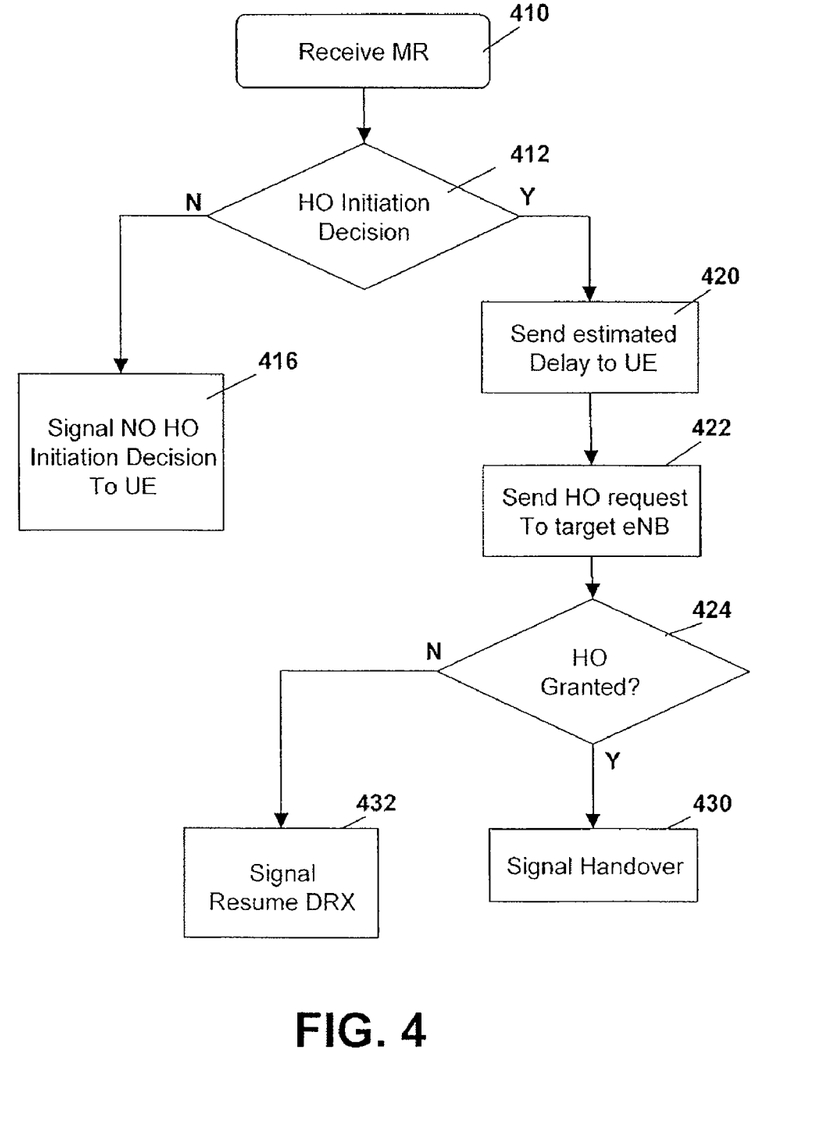
FIG. 4 is a flow chart showing an alternative method on an eNB for efficient DRX operation during handover in LTE.

Referring to FIG. 4, this figure shows the eNB side of the embodiment of FIG. 3. In FIG. 4, an eNB receives a measurement report at step 410 and at step 412 makes a handover initiation decision. If the handover initiation decision from step 412 is that no handover should occur, the process proceeds to step 416 in which this is signaled to the UE.

Conversely, from step 412 if handover is to occur, the process proceeds to step 420 in which information about the estimated delay is sent to the UE. This information can be stored on the eNB and thus could be merely a look-up that is then sent to the UE. As indicated above, the estimated delay could be defined from standards bodies or be set based on heuristic information or information set by a carrier, among other options.

From step 420, the process proceeds to step 422 in which the handover request is sent to the target eNB.

The process then proceeds to step 424 in which it receives a handover request acknowledgement or a negative acknowledgement from the target eNB. If in step 424 the process receives a handover request acknowledgement, the process then proceeds to step 430 in which a handover is signaled to the UE.

Conversely, if in step 424 the handover request is denied, the process proceeds to step 432 in which the UE is signaled to stop channel monitoring and resume its normal DRX cycle.

The embodiments of FIGS. 3 and 4 therefore provide potential battery life savings if a shorter DRX period is entered into on the UE. The receiver can turn off for the period of time that corresponds with the processing delay at the target eNB.

As will be appreciated by those skilled in the art, in a further embodiment, step 318 and step 420 from FIGS. 3 and 4 respectively could be avoided by having delays already stored on the UE. The UE could be provisioned with these delays at the time of manufacture or subsequently. The UE could in this case use the pre-stored delay to extend the DRX awake period or to use a shorter DRX.

Figure 5:
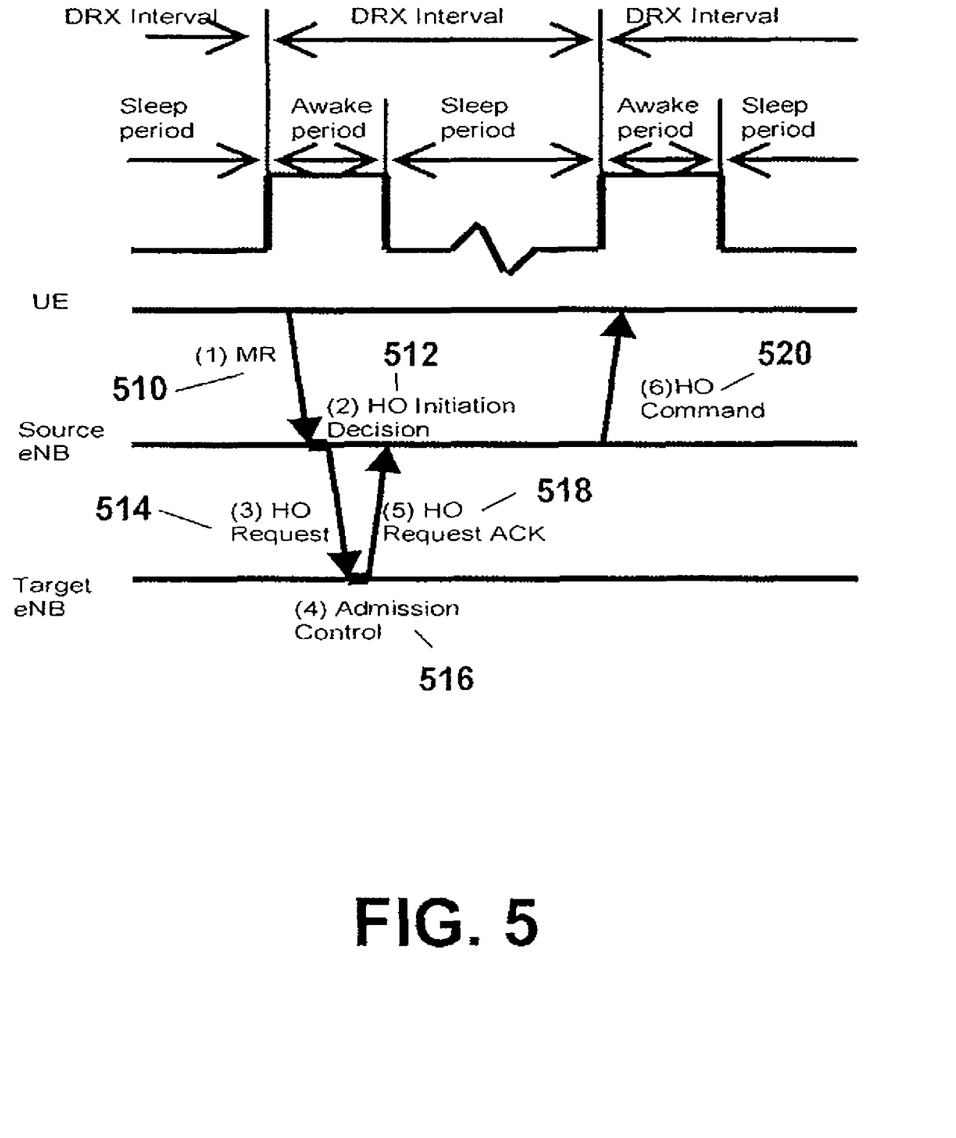
FIG. 5 is a timing diagram showing a typical handover during the DRX interval in LTE_ACTIVE.

Reference is now made to FIG. 5. FIG. 5 shows a timing diagram of a typical DRX operation during a handover operation. In a typical handover operation, during the DRX "awake" period, the UE is triggered to send a measurement report by rules it receives from radio resource control messages, system information, among others. This is shown by arrow 510.

The source eNB makes a handover initiation decision based on measurement report and radio resource management information to hand off the UE to a target eNB. This handover initiation decision is made before the source eNB sends the handover request to the target eNB. It is therefore possible that even though the source eNB has made the handover initiation decision, the handover request could be rejected by the admission control of the target eNB. The handover initiation decision is shown by arrow 512 in FIG. 5.

Arrow 514 depicts the source eNB issuing a handover request message to a target eNB passing information necessary to prepare the handover at the target side. Such information includes the UE X2 signaling context reference at source eNB, target cell identifiers, radio resource control contexts, SAE (system architecture evolution) bearer contexts, among others.

Arrow 516 shows the admission control that is performed by the target eNB which is dependent on the received SAE bearer quality of service information. If the resources can be granted by the target eNB, it configures them according to the received SAE bearer quality of service information and reserves a C-RNTI (cell radio network temporary identifier).

Arrow 518 illustrates a handover request acknowledgement that is sent from the target eNB to the source eNB. The handover request acknowledgement message includes a transparent container to be sent to the UE as part of the handover command. The container may include new C-RNTI, and may possibly include other parameters including access parameters, SIBs, among others.

The source eNB then waits for the next DRX awake period before sending a handover command shown by arrow 520.

As will be appreciated by those skilled in the art, the above delays the handover command until the next DRX cycle, which may be undesirable with a long DRX cycle.

Figure 6:
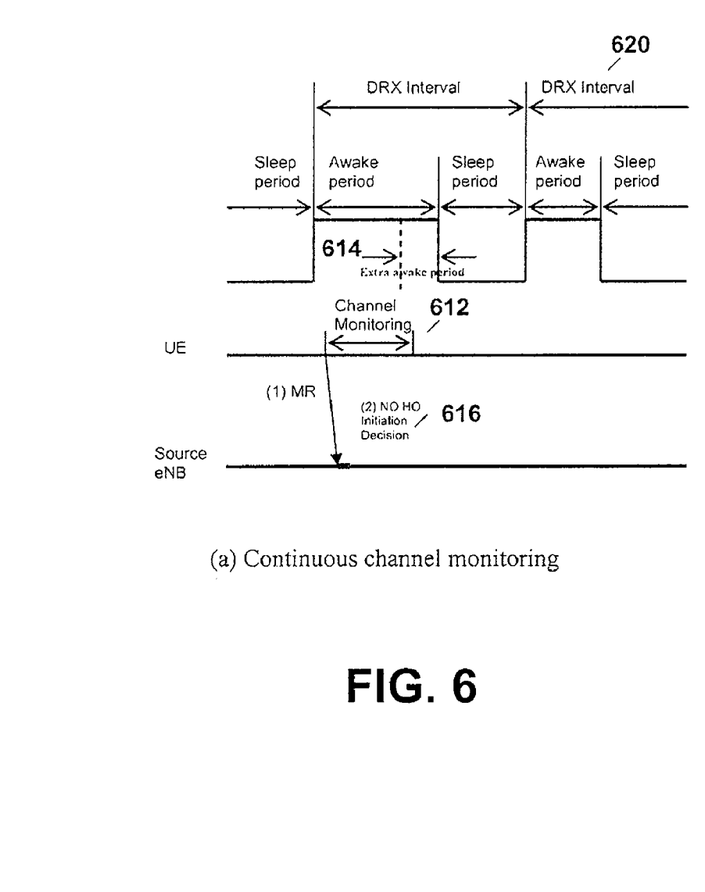
FIG. 6 is a timing diagram illustrating transition to continuous channel monitoring on the sending of a measurement report.

Referring to FIG. 6, this figure illustrates a timing diagram corresponding with the embodiment of FIGS. 1 and 2. In FIG. 6, instead of sending the measurement report and then moving into the DRX sleep period, as described above, the UE moves into a continuous channel monitoring stage, as depicted by arrow 612 and this could include an extra awake period as depicted by arrow 614.

In this case, if a no handover initiation decision is made, shown by arrow 616, the UE can enter its normal DRX interval 620.

Figure 7:
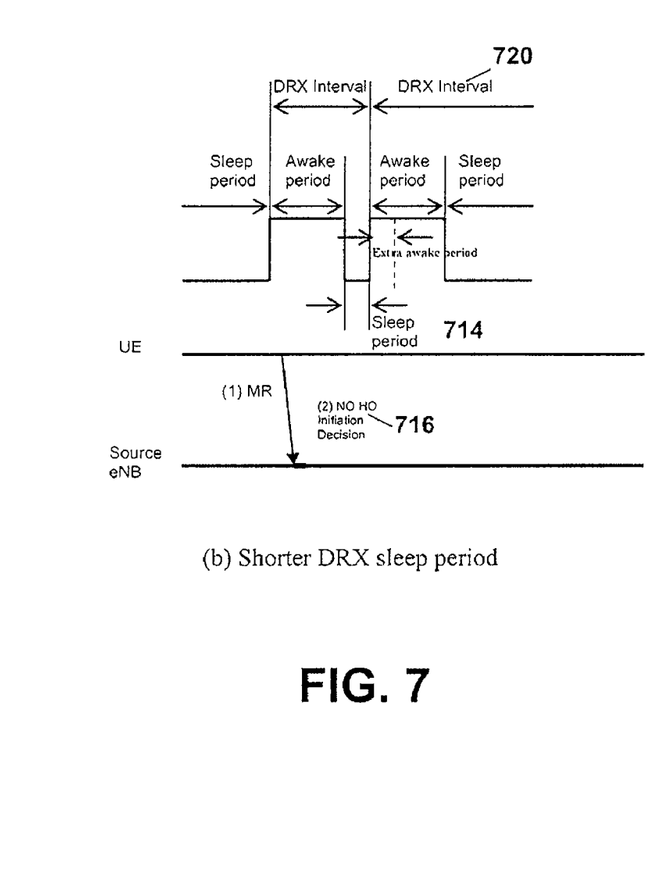
FIG. 7 is a timing diagram illustrating transition to a shorter DRX sleep period on the sending of a measurement report.

Alternatively, reference is made to FIG. 7, which shows a timing diagram corresponding to the embodiments of FIGS. 3 and 4. In FIG. 7, after a measurement report is sent, the source eNB signals a shorter DRX sleep period 714, which is then implemented by the UE. However, since there is a No handover initiation decision 716, the process resumes its normal DRX interval 720.

Figure 8:
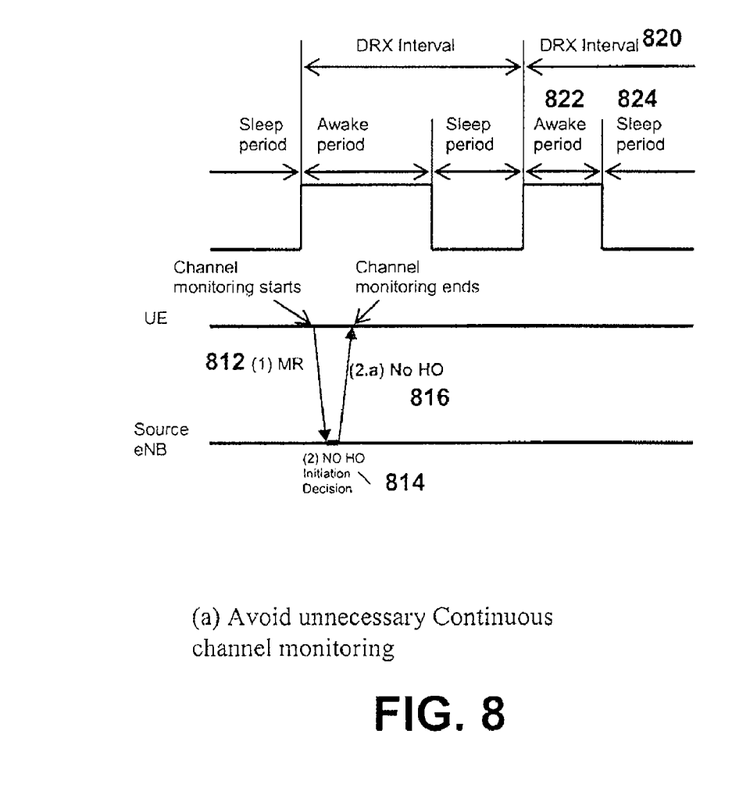
FIG. 8 is a timing diagram illustrating the ending of continuous channel monitoring upon reception of a no handover initiation decision by a UE.

Referring to FIG. 8, FIG. 8 illustrates the DRX intervals including the awake period and the sleep period.

In FIG. 8, the UE sends a measurement report 812, at the same time channel monitoring starts.

The source eNB then makes a no handover initiation decision 814, which is signaled to the UE. This is depicted by arrow 816. The process then ends the channel monitoring and resumes its normal DRX interval 820 including the awake period 822 and sleep period 824.

Figure 9:
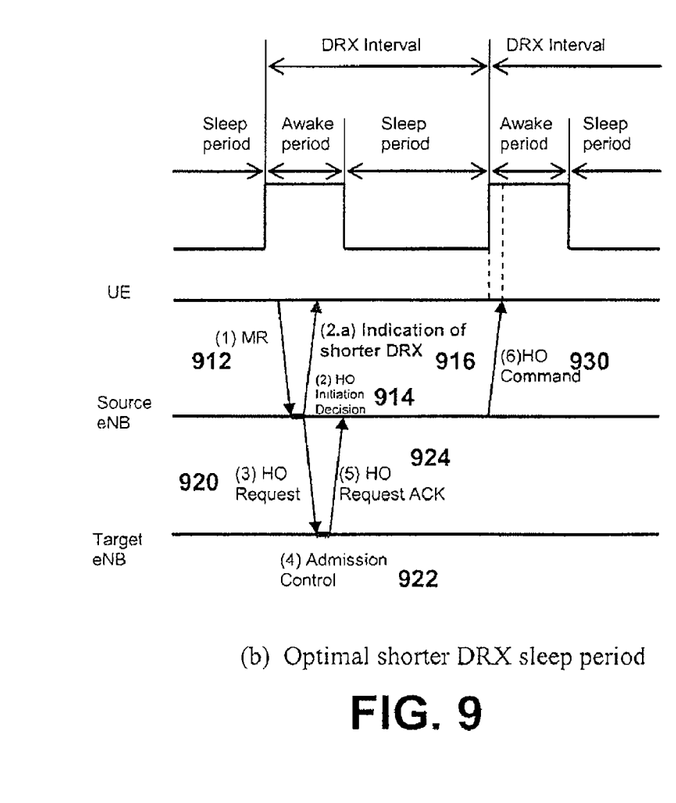
FIG. 9 is a timing diagram illustrating the adoption of an optimal shorter DRX sleep period while waiting for a handover command at a UE.

Referring to FIG. 9. The UE sends a measurement report 912 and in this case, the source eNB makes a handover initiation decision 914.

In the timing and signaling diagram of FIG. 9, an indication of a shorter DRX period is signaled. This is depicted by arrow 916.

The source eNB then sends a handover request 920 to a target eNB. The target eNB performs admission control 922 and sends a handover request acknowledgement 924 to the source eNB.

The handover command is then optimally sent to the UE, as depicted by arrow 930. The handover command 930 is preferably at the end of a sleep period that was indicated for the shorter DRX 916 and thus the handover does not require undo delays but also saves battery resources.

As will be appreciated, the above can be implemented on any mobile device. Such mobile devices are known to those skilled in the art, and can include cellular telephones, personal digital assistants, mobile pagers, smart phones, or other such devices. One exemplary device is illustrated in FIG. 10.

Figure 10:
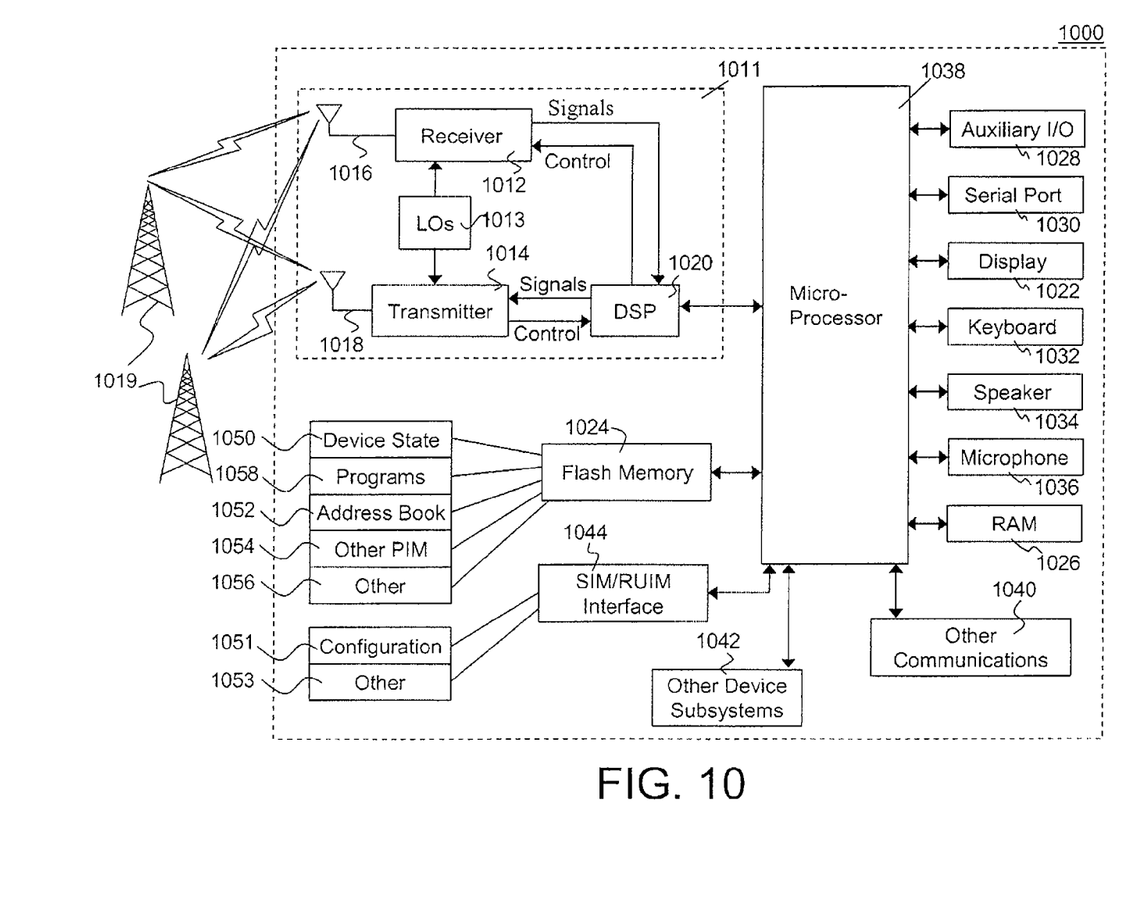
FIG. 10 is a block diagram illustrating an exemplary mobile device for use in association with the method and system of the present disclosure.

FIG. 10 is a block diagram illustrating user equipment apt to be used with preferred embodiments of the apparatus and method of the present application. User equipment 1000 is preferably a two-way wireless communication device having at least voice and data communication capabilities. User equipment 1000 preferably has the capability to communicate with other computer systems on the Internet.

User equipment 1000 incorporates a communication subsystem 1011, including both a receiver 1012 and a transmitter 1014, as well as associated components such as one or more, preferably embedded or internal, antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate.

An LTE user equipment may require a removable user identity module (RUIM) or a subscriber identity module (SIM) card in order to operate on a network. The SIM/RUIM interface 1044 is normally similar to a card-slot into which a SIM/RUIM card can be inserted and ejected like a diskette or PCMCIA card. The SIM/RUIM card can have approximately 64K of memory and hold many key configuration 1051, and other information 1053 such as identification, and subscriber related information.

When required network registration or activation procedures have been completed, user equipment 1000 may send and receive communication signals over a network 1019. As illustrated in FIG. 10, network 1019 can consist of multiple base stations communicating with the user equipment.

Signals received by antenna 1016 through communication network 1019 are input to receiver 1012, which may perform such common receiver functions as signal amplification, frequency down conversion, filtering, channel selection and the like, and in the example system shown in FIG. 10, analog to digital (A/D) conversion. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control.

For example, the gains applied to communication signals in receiver 1012 and transmitter 1014 may be adaptively controlled through automatic gain control algorithms implemented in DSP 1020.

User equipment 1000 preferably includes a microprocessor 1038 which controls the overall operation of the device. Communication functions, including at least data and voice communications, are performed through communication subsystem 1011. Microprocessor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the microprocessor 1038 is preferably stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Microprocessor 1038, in addition to its operating system functions, preferably enables execution of software applications on the user equipment. A predetermined set of applications that control basic operations, including at least data and voice communication applications for example, will normally be installed on user equipment 1000 during manufacturing. Other applications could be installed subsequently or dynamically.

A preferred software application may be a personal information manager (PIM) application having the ability to organize and manage data items relating to the user of the user equipment such as, but not limited to, e-mail, calendar events, voice mails, appointments, and task items. Naturally, one or more memory stores would be available on the user equipment to facilitate storage of PIM data items. Such PIM application would preferably have the ability to send and receive data items, via the wireless network 1019. In a preferred embodiment, the PIM data items are seamlessly integrated, synchronized and updated, via the wireless network 1019, with the user equipment user's corresponding data items stored or associated with a host computer system. Further applications may also be loaded onto the user equipment 1000 through the network 1019, an auxiliary I/O subsystem 1028, serial port 1030, short-range communications subsystem 1040 or any other suitable subsystem 1042, and installed by a user in the RAM 1026 or preferably a non-volatile store (not shown) for execution by the microprocessor 1038. Such flexibility in application installation increases the functionality of the device and may provide enhanced on-device functions, communication-related functions, or both. For example, secure communication applications may enable electronic commerce functions and other such financial transactions to be performed using the user equipment 1000.

In a data communication mode, a received signal such as a text message or web page download will be processed by the communication subsystem 1011 and input to the microprocessor 1038, which preferably further processes the received signal for output to the display 1022, or alternatively to an auxiliary I/O device 1028.

A user of user equipment 1000 may also compose data items such as email messages for example, using the keyboard 1032, which is preferably a complete alphanumeric keyboard or telephone-type keypad, in conjunction with the display 1022 and possibly an auxiliary I/O device 1028. Such composed items may then be transmitted over a communication network through the communication subsystem 1011.

For voice communications, overall operation of user equipment 1000 is similar, except that received signals would preferably be output to a speaker 1034 and signals for transmission would be generated by a microphone 1036. Alternative voice or audio I/O subsystems, such as a voice message recording subsystem, may also be implemented on user equipment 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type user equipment for which synchronization with a user's desktop computer (not shown) may be desirable, but is an optional device component. Such a port 1030 would enable a user to set preferences through an external device or software application and would extend the capabilities of user equipment 1000 by providing for information or software downloads to user equipment 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the mobile device to a computer to act as a modem.

Other communications subsystems 1040, such as a short-range communications subsystem, is a further optional component which may provide for communication between user equipment 1000 and different systems or devices, which need not necessarily be similar devices. For example, the subsystem 1040 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for efficient discontinuous reception ('DRX') operation during handover in Long Term Evolution ('LTE') in which a user equipment expects handover to occur between a source enhanced Node B ('eNB') and a target eNB, the method comprising the steps of:
    checking, at the user equipment, whether a no handover initiation decision by the source eNB is received from the source eNB within a predetermined time period; if the no handover initiation decision by the source eNB is not received from the source eNB within a predetermined time period, performing the steps of:
        ensuring the user equipment is not in a DRX sleep period during reception of a handover grant;
        checking whether a handover grant is received,
            if the handover grant is received, performing a handover procedure; and
            if the handover grant is not received, resuming a DRX sleep interval; and
    if the no handover initiation decision by the source eNB is received from the source eNB within the predetermined time period, resuming a DRX sleep interval; and wherein
    the step of ensuring the user equipment is not in the DRX sleep period utilizes a short DRX period;
    the short DRX period has a length set based on a value that is one of received from the source eNB or pre-configured; and
    the value is dependent on whether the handover is inter radio access technology or intra radio access technology.

2. The method of claim 1, wherein the step of ensuring the user equipment is not in the DRX sleep period utilizes continuous reception on the user equipment.

3. The method of claim 1, wherein the step of ensuring the user equipment is not in the DRX sleep period utilizes an extended DRX awake period.

4. The method of claim 1, wherein the value is predetermined and stored on the source eNB.

5. The method of claim 1, further comprising the steps of:
    making, at the source eNB, the handover initiation decision; and
    signaling the handover initiation decision to the user equipment.

6. The method of claim 1 further comprising, after said resuming step, receiving updated measurement control information for handover procedures.

7. The method of claim 1, wherein the user equipment is expecting handover to occur based on the sending of a measurement report.

8. The method of claim 1, wherein the user equipment is expecting handover to occur based on a parameter in the measurement report being above or below a predetermined threshold.

9. A system for efficient discontinuous reception ('DRX') operation during handover in Long Term Evolution ('LTE') comprising user equipment and an enhanced node B, the system configured to:
    check, by the user equipment, whether a no handover initiation decision by the enhanced Node B is received from the enhanced Node B within a predetermined time period;
    if the no handover initiation decision by the enhanced Node B is not received from the enhanced Node B within the predetermined time period, ensure the user equipment is not in a DRX sleep period during reception of a handover grant;
check whether a handover grant is received,
 if the handover grant is received, perform a handover procedure; and
 if the handover grant is not received, resume a DRX sleep interval;
if the no handover initiation decision by the enhanced Node B is received from the enhanced Node B within the predetermined time period, resume a DRX sleep interval at the user equipment; and wherein
ensuring the user equipment is not in the DRX sleep period comprises utilizing a short DRX period;
the short DRX period has a length set based on a value that is one of received from the enhanced node B or preconfigured; and
the value is dependent on whether the handover is inter radio access technology or intra radio access technology.

10. The system of claim 9, wherein ensuring the user equipment is not in the DRX sleep period comprises utilizing continuous reception on the user equipment.

11. The system of claim 9, wherein ensuring the user equipment is not in the DRX sleep period utilizes an extended DRX awake period.

12. The system of claim 9, wherein the value is predetermined and stored on the enhanced node B.

13. The system of claim 9 further configured to receive, at the user equipment, updated measurement control information for handover procedure.

14. The system of claim 9, wherein the user equipment is adapted to expect handover to occur based on the sending of a measurement report.

15. The system of claim 9, wherein the user equipment is adapted to expect handover to occur based on a parameter in the measurement report being above or below a predetermined threshold.

* * * * *